No. 732,132. Patented June 30, 1903.

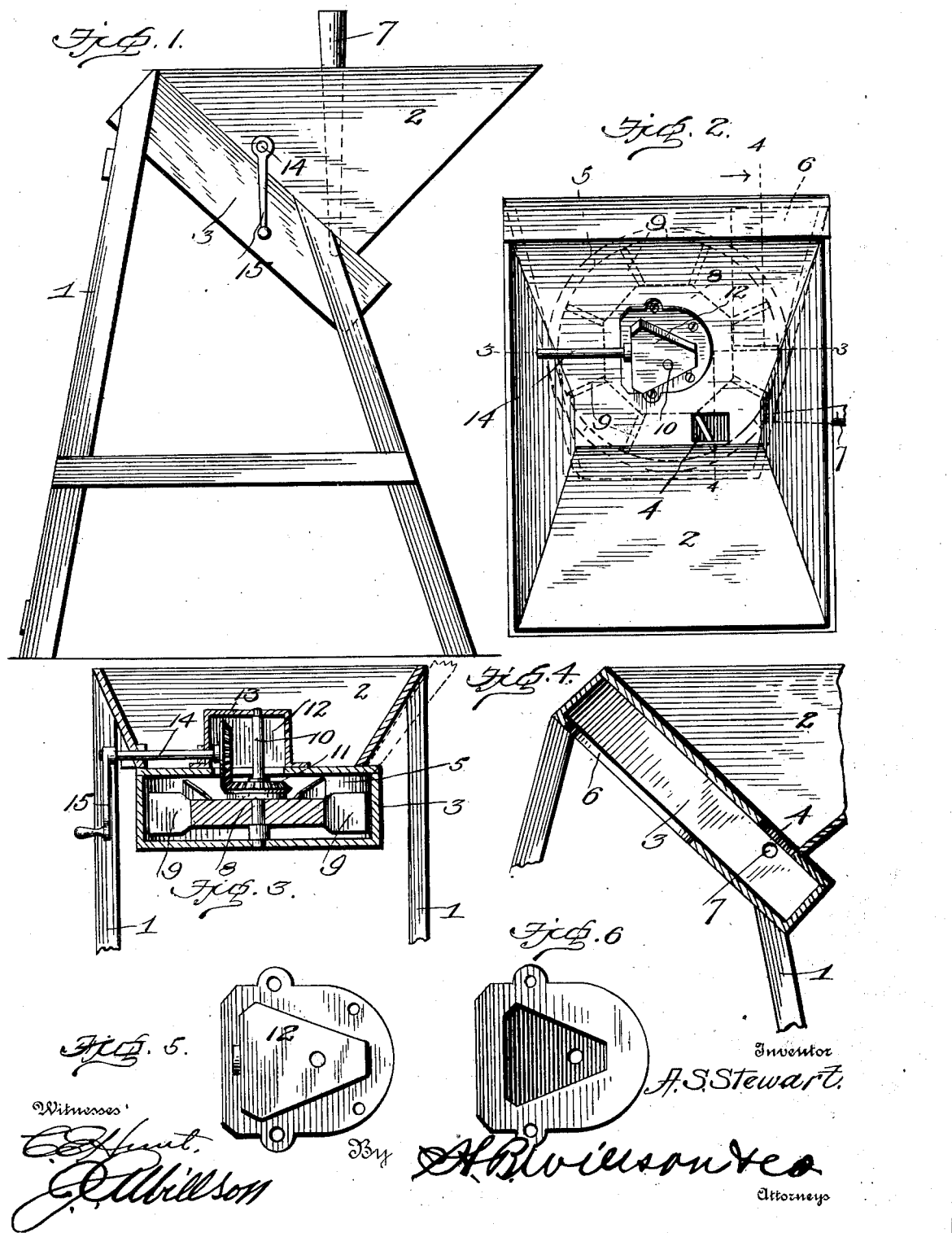

UNITED STATES PATENT OFFICE.

ALEXANDER S. STEWART, OF NECHE, NORTH DAKOTA.

GRAIN-TREATING APPARATUS.

SPECIFICATION forming part of Letters Patent No. 732,132, dated June 30, 1903.

Application filed March 18, 1902. Renewed December 15, 1902. Serial No. 135,328. (No model.)

*To all whom it may concern:*

Be it known that I, ALEXANDER S. STEWART, a citizen of the United States, residing at Neche, in the county of Pembina and State of North Dakota, have invented certain new and useful Improvements in Grain-Treating Apparatus; and I do declare the following to be a full, clear, and exact description of the invention, such as will enable others skilled in the art to which it appertains to make and use the same.

This invention relates to an apparatus for treating cereals, and particularly to an apparatus adapted to be employed for treating smutty cereals to render them fit for use as seed-grain.

The object of the invention is to provide a simple and effective apparatus of this character designed to use formaldehyde or bluestone solutions or any other suitable agent which will kill the smut-germs quickly and efficiently without injuring the grain in any manner or destroying the germinating properties thereof.

With this and other objects in view, which will readily appear as the nature of the invention is better understood, said invention consists in certain novel features of construction and combination and arrangement of parts, which will be hereinafter fully described, defined in the appended claim, and illustrated in the accompanying drawings, in which—

Figure 1 is a side elevation of a cereal-washing apparatus embodying my invention. Fig. 2 is a top plan view of the same. Figs. 3 and 4 are sectional views taken on the lines 3 3 and 4 4 of Fig. 2. Figs. 5 and 6 are top and bottom views of the bearing-bracket.

In the drawings, the numeral 1 represents the supporting-frame, which may be of any desired form and construction. At the top of this frame is arranged a hopper 2, which contains the grain to be treated. This hopper is superposed upon an inclined mixing or soaking box or chamber 3, which is in communication near its lowest point with the hopper through an inlet opening or passage 4, through which the grain is fed thereto from said hopper.

The box or chamber 3 may be of any form suitable for the purpose, but is preferably closed at top and constructed or formed to provide an annular passage 5 for the circulation of the grain under treatment. The inlet 4 communicates with this passage at the lowest point thereof, and near one side of the chamber the bottom of the chamber is formed or provided with an outlet 6 for the discharge of the soaked grain. The soaking liquid or fluid is conducted to the passage at a point adjacent to the inlet 4 through a spout or conductor 7, so as to come in contact with the admitted smutty grain.

Arranged to rotate within the soaking-chamber is an agitator and conveyer consisting of a head 8, carrying a series of radial blades or vanes 9, which traverse the passage 5. The head 8 is carried by a shaft 10, which carries a bevel-gear 11, which turns within a bearing-bracket 12, fixed to the top of said chamber. Meshing with this gear is a bevel-gear 13, carried by a drive-shaft 14, journaled in said bracket and hopper and provided at its outer end with a crank-handle 15, whereby motion may be transmitted to the gears to rotate the agitator.

In the use of the apparatus the grain or cereal flows into the lower portion of the passage through the inlet 4 from the hopper 2, and the smut-killing fluid is introduced at the same portion through the spout 7. The agitator is set in motion by the operation of the crank 15, and the vanes 9 sweep the grain and fluid around the passage 5, thereby thoroughly agitating the same and soaking the grain. The grain or cereal is thoroughly soaked when it reaches the outlet 6 and discharges therethrough into a suitable receptacle.

The bearing-bracket 12 is arranged above a central opening in the top of the box and comprises a base seated upon and secured to the top of the box and a substantially triangular-shaped housing rising from said base. The upper end of the shaft 10 is journaled in the top of this housing and the inner end of the shaft 14 in the upper end wall thereof, and said housing receives and incloses the gear 13 and covers the said central opening. By this construction the parts of the gearing are shielded and protected and the inlet of grain from the hopper and dirt and other foreign substances to the box through the said central opening prevented.

From the foregoing description, taken in connection with the accompanying drawings, the construction and mode of operation of the device will be readily understood, and it will be seen that a simple and inexpensive form of washing apparatus is provided. By the use of the invention all kinds of grains and cereals may be treated and smutty and the lower grades of wheat, &c., reclaimed for use as seed.

Changes in the form, proportion, and the minor details of construction may be resorted to without departing from the principle or sacrificing any of the advantages of this invention.

Having thus described my invention, what I claim as new, and desire to secure by Letters Patent, is—

In an apparatus for treating smutty cereals for the purpose of killing the smut, the combination of a supporting-frame, an inclined mixing-box mounted upon the frame and having an annular passage for the circulation of the grain, said box also having a central opening in its top, an inlet-opening in its top adjacent to the lowermost point of the annular passage and an outlet-opening in its bottom for the discharge of the treated grain at the highest point of the annular passage, a hopper mounted upon the top of the box, means for supplying a smut-killing fluid to the lowest part of the annular passage, a rotary agitator within the box and provided with blades to sweep around said annular passage, a vertical shaft rigidly connected to the agitator and projecting upward through the central opening and journaled at its lower end in the bottom of the box, a bevel-gear carried by said shaft, a bearing-bracket fixed to the top of the box and having a housing covering the central opening, the top wall of said housing serving as a bearing for the upper end of the vertical shaft, a drive-shaft extending into the housing, and a gear carried by the drive-shaft and inclosed within the housing and projecting down through the central opening to mesh with the said gear on the vertical shaft, substantially as described.

In testimony whereof I have hereunto set my hand in presence of two subscribing witnesses.

ALEXANDER S. STEWART.

Witnesses:
C. MURPHY,
MARY SHAY.